（12） United States Patent
Kim et al.

(10) Patent No.: US 12,334,605 B2
(45) Date of Patent: Jun. 17, 2025

(54) FUEL CELL HUMIDIFIER AND MANUFACTURING METHOD THEREFOR

(71) Applicant: KOLON INDUSTRIES, INC., Seoul (KR)

(72) Inventors: Do Woo Kim, Seoul (KR); Na Hyeon An, Seoul (KR); Kyoung Ju Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 730 days.

(21) Appl. No.: 17/605,556

(22) PCT Filed: Jun. 24, 2020

(86) PCT No.: PCT/KR2020/008129
§ 371 (c)(1),
(2) Date: Oct. 21, 2021

(87) PCT Pub. No.: WO2020/262911
PCT Pub. Date: Dec. 30, 2020

(65) Prior Publication Data
US 2022/0123334 A1    Apr. 21, 2022

(30) Foreign Application Priority Data

Jun. 25, 2019    (KR) .................. 10-2019-0075646

(51) Int. Cl.
*H01M 8/04*    (2016.01)
*H01M 8/04119*    (2016.01)

(52) U.S. Cl.
CPC .................. *H01M 8/04149* (2013.01)

(58) Field of Classification Search
CPC .................................. H01M 8/04149
See application file for complete search history.

(56) References Cited

U.S. PATENT DOCUMENTS 6,316,139 B1 * 11/2001 Uchida ............... H01M 8/0271
429/510
9,190,677 B2 * 11/2015 Kim .................. H01M 8/04149
(Continued)

FOREIGN PATENT DOCUMENTS

CN    103346338 A    10/2013
CN    105322202 A    2/2016
(Continued)

OTHER PUBLICATIONS

JP office action dated Nov. 29, 2022.
(Continued)

*Primary Examiner* — Charles S Bushey
(74) *Attorney, Agent, or Firm* — Harvest IP Law, LLP

(57) ABSTRACT

Disclosed are: a fuel cell humidifier capable of reliably preventing a gas leak due to repeated operating and stopping of a fuel cell and capable of being manufactured with relatively low manufacturing costs and high productivity; and a manufacturing method therefor. The fuel cell humidifier of the present invention includes a humidifying module and caps coupled to both ends of the humidifying module, respectively, wherein: the humidifying module includes a mid-case, a plurality of hollow fiber membranes in the mid-case, a fixed layer in which the ends of the hollow fiber membranes are potted, and a composite gasket having a groove into which the end of the mid-case is fitted; the composite gasket includes an inner body, an outer body, and a connecting body provided therebetween and formed of a first material; and at least a portion of the inner body is adhered to the fixed layer and is formed of a second material that is different from the first material.

16 Claims, 9 Drawing Sheets

(56) References Cited

U.S. PATENT DOCUMENTS

| | | | | |
|---|---|---|---|---|
| 9,640,814 | B2* | 5/2017 | Kim | ................ B60L 1/003 |
| 2003/0029785 | A1 | 2/2003 | Dannenmaier | |
| 2012/0015283 | A1* | 1/2012 | Cha | ................ H01M 8/1011 |
| | | | | 429/516 |
| 2013/0065158 | A1 | 3/2013 | Masaka | |
| 2022/0255092 | A1* | 8/2022 | Kim | ................ H01M 8/028 |
| 2024/0063407 | A1* | 2/2024 | Yang | ................ H01M 8/04119 |
| 2024/0243310 | A1* | 7/2024 | Kim | ................ H01M 8/04119 |

FOREIGN PATENT DOCUMENTS

| | | |
|---|---|---|
| CN | 208955115 U | 6/2019 |
| JP | S6157207 A | 3/1986 |
| JP | 2003065566 A | 3/2003 |
| JP | 2003112016 A | 4/2003 |
| JP | 2004028490 A | 1/2004 |
| JP | 2014522556 A | 9/2014 |
| JP | 2016035895 A | 3/2016 |
| KR | 20130086147 A | 7/2013 |
| KR | 20140117346 A | 10/2014 |
| KR | 20160015541 A | 2/2016 |
| KR | 20160061988 A | 6/2016 |
| WO | 9212787 A1 | 8/1992 |
| WO | 2013100677 A1 | 7/2013 |
| WO | 2015046430 A1 | 4/2015 |

OTHER PUBLICATIONS

The office action dated Aug. 24, 2023 related to the corresponding Chinese Patent application.
The search report dated May 30, 2023 related to the corresponding European Patent application.
KR office action dated Jan. 3, 2022.

* cited by examiner

Prior Art

FUEL CELL HUMIDIFIER AND MANUFACTURING METHOD THEREFOR

CROSS REFERENCE TO RELATED APPLICATIONS

This application is a National Stage of International Application No. PCT/KR2020/008129 filed Jun. 24, 2020, claiming priority based on Korean Patent Application No. 10-2019-0075646 filed Jul. 25, 2019.

TECHNICAL FIELD

The present disclosure relates to a humidifier for a fuel cell and a method of manufacturing the same, and more particularly to a humidifier for a fuel cell capable of certainly preventing gas leakage due to repeated operation and stop of a fuel cell and being manufactured with relatively low manufacturing cost and high productivity and a method of manufacturing the same.

BACKGROUND ART

A fuel cell is a power generation cell that combines hydrogen and oxygen to generate electricity. The fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may generally be classified into a polymer electrolyte membrane fuel cell (PEMFC), a phosphoric acid fuel cell (PAFC), a molten carbonate fuel cell (MCFC), a solid oxide fuel cell (SOFC), and an alkaline fuel cell (AFC), and so on.

These fuel cells are operated fundamentally by the same principle, but are different from each other in terms of the kind of fuel that is used, operating temperature, catalyst, and electrolyte. Among these fuel cells, the polymer electrolyte membrane fuel cell (PEMFC) is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors in improving the performance of the polymer electrolyte membrane fuel cell (PEMFC) is to supply a predetermined amount or more of moisture to a polymer electrolyte membrane or a proton exchange membrane (PEM) of a membrane electrode assembly (MEA) in order to retain moisture content. The reason for this is that, if the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas stream pipe through a solenoid valve, and 3) a membrane humidification method of supplying moisture to a gas fluid bed using a polymer separation membrane are used as methods of humidifying the polymer electrolyte membrane or the proton exchange membrane.

Among these methods, the membrane humidification method, which provides water vapor to gas (i.e. air or fuel gas) that is supplied to the polymer electrolyte membrane or the proton exchange membrane using a membrane configured to selectively transmit only water vapor included in off-gas in order to humidify the polymer electrolyte membrane or the proton exchange membrane, is advantageous in that it is possible to reduce the weight and size of a humidifier.

When a module is formed, a hollow fiber membrane having large transmission area per unit volume is suitable for a permselective membrane used in the membrane humidification method. That is, when a humidifier is manufactured using a hollow fiber membrane, high integration of the hollow fiber membrane having large contact surface area is possible, whereby it is possible to sufficiently humidify the polymer electrolyte membrane or the proton exchange membrane even at a small capacity, it is possible to use a low-priced material, and it is possible to collect moisture and heat included in off-gas discharged from the fuel cell at a high temperature and to reuse the collected moisture and heat through the humidifier.

As illustrated in FIG. 1, a conventional membrane humidification type humidifier 1000 includes a humidifying module 1100 in which moisture exchange is performed between gas supplied from the outside and off-gas discharged from a fuel cell stack (not shown), and caps 1200 coupled respectively to opposite ends of the humidifying module 1100.

One of the caps 1200 transmits gas supplied from the outside to the humidifying module 1100, and the other cap transmits gas humidified by the humidifying module 1100 to the fuel cell stack.

The humidifying module 1100 includes a mid-case 1110 having an off-gas inlet 1110a and an off-gas outlet 1110b and a plurality of hollow fiber membranes 1120 disposed in the mid-case 1110. Opposite ends of a bundle of hollow fiber membranes 1120 are potted in fixing layers 1130. In general, each of the fixing layers 1130 is formed by hardening a liquid polymer, such as liquid polyurethane resin, using a casting method (e.g. dip casting, which is also called dip potting, or centrifugal casting, which is also called centrifugal potting).

Gas supplied from the outside flows along hollow parts of the hollow fiber membranes 1120. Off-gas introduced into the mid-case 111 through the off-gas inlet 1110a comes into contact with the outer surfaces of the hollow fiber membranes 1120, and is discharged from the mid-case 111 through the off-gas outlet 1110b. When the off-gas comes into contact with the outer surfaces of the hollow fiber membranes 1120, moisture contained in the off-gas is transmitted through the hollow fiber membranes 1120 to humidify gas flowing along the hollow parts of the hollow fiber membranes 1120.

Inner spaces of the caps 1200 must fluidly communicate with only the hollow parts of the hollow fiber membranes 1120 in a state of being completely isolated from an inner space of the mid-case 1110. If not, gas leakage due to pressure difference occurs, whereby power generation efficiency of a fuel cell is reduced.

In general, as illustrated in FIG. 1, the fixing layers 1130 and resin layers 1140 provided between the fixing layers 1130 and the mid-case 1110 isolate the inner spaces of the caps 1200 from the inner space of the mid-case 1110. Similarly to the fixing layers 1130, each of the resin layers 1140 is generally formed by hardening a liquid polymer, such as liquid polyurethane resin, using a casting method (dip casting or centrifugal casting).

However, (i) the resin layer 1140 is alternately expanded and contracted as a result of repeated operation and stop of the fuel cell, whereby the resin layer 1140 is separated from the mid-case 1110 due to a difference in coefficient of thermal expansion between the mid-case 1110 and the resin layer 1140, and therefore a gap is generated therebetween, or (ii) there is a high probability of a gap being generated between the resin layer 1140 and the mid-case 1110 due to vibration and/or impact. The gap between the resin layer 1140 and the mid-case 1110 causes gas leakage, thereby reducing power generation efficiency of the fuel cell.

In order to prevent gas leakage due to generation of the gap between the resin layer 1140 and the mid-case 1110, Korean Registered Patent No. 1697998 discloses a method of applying a sealant (liquid sealing member) to a step formed on the side surface of the resin layer 1140 and a groove formed in the inner surface of the mid-case 1110, inserting a packing member (solid sealing member) into the groove, and hardening the sealant.

However, the above method has problems of low productivity and high manufacturing cost in that (i) the sealant must be applied so as to accurately match with the groove, whereby workability is low, (ii) a considerably long time of 24 hours or more is required to harden the sealant, and (iii) a separate space for storing the humidifying module 1100 is required until the sealant is hardened.

DISCLOSURE

Technical Problem

Therefore, the present disclosure relates to a humidifier for a fuel cell capable of preventing problems caused by limitations and shortcomings of the related art described above and a method of manufacturing the same.

It is an object of the present disclosure to provide a humidifier for a fuel cell capable of certainly preventing gas leakage due to repeated operation and stop of a fuel cell and being manufactured with relatively low manufacturing cost and high productivity.

It is another object of the present disclosure to provide a method of manufacturing a humidifier for a fuel cell capable of certainly preventing gas leakage due to repeated operation and stop of a fuel cell with relatively low manufacturing cost and high productivity.

In addition to the above objects, other features and advantages of the present disclosure will be described hereinafter, or will be clearly understood by those skilled in the art to which the present disclosure pertains from the following description thereof.

Technical Solution

In accordance with an aspect of the present disclosure, there is provided a humidifier for a fuel cell, the humidifier including a humidifying module configured to humidify gas supplied from outside using moisture in off-gas discharged from a fuel cell stack and caps coupled respectively to opposite ends of the humidifying module, wherein the humidifying module includes a mid-case open at opposite ends thereof, a plurality of hollow fiber membranes disposed in the mid-case, a fixing layer in which ends of the hollow fiber membranes are potted, and a composite gasket having a groove into which the end of the mid-case is inserted, the composite gasket includes an inner body based on the groove, the inner body being located inside the mid-case, an outer body based on the groove, the outer body being located outside the mid-case, and a connecting body located between the inner body and the outer body, the connecting body being formed of a first material, and at least a portion of the inner body is adhered to the fixing layer and is formed of a second material different from the first material.

The first material may be soft rubber, and the second material may be metal, rigid plastic, hard rubber, or a different kind of soft rubber from the first material.

The first material may include soft silicone rubber or soft urethane rubber, and the second material may include polypropylene (PP), polyethylene terephthalate (PET), polystyrene (PS), polycarbonate (PC), acrylic resin, hard silicone, or hard urethane.

When the first material includes soft silicone rubber, the second material may include soft urethane rubber.

The inner body may include a first part directly connected to the connecting body, the first part being formed of the first material, and a second part adhered to the first part and to the fixing layer, the second part being formed of the second material.

The interface between the first and second parts may have a step.

The first part of the inner body may constitute a packing part formed of the first material together with the outer body and the connecting body, and the second part of the inner body may constitute a bracket part formed of the second material.

The packing part and the bracket part may be integrally formed through injection molding.

The composite gasket may further include a primer layer formed on at least a portion of the surface of the inner body, the primer layer including a rubber adhesive component, an acrylic adhesive component, a polyurethane adhesive component, an epoxy adhesive component, a silicone adhesive component, a polyamide-based adhesive component, a polyimide-based adhesive component, or a mixture of two or more thereof.

The fixing layer may include a first fixing layer in which the ends of the hollow fiber membranes are potted, and a second fixing layer adhered to the inner body of the composite gasket while surrounding the first fixing layer.

The first fixing layer and the second fixing layer may be formed of the same material.

Both the first fixing layer and the second fixing layer may include polyurethane (PU) resin.

The humidifying module may further include an inner case disposed in the mid-case, the inner case being open at opposite ends thereof, the hollow fiber membranes may be disposed in the inner case, and the end of the inner case may be potted in the first fixing layer.

The hollow fiber membranes may include a first group of hollow fiber membranes and a second group of hollow fiber membranes, the humidifying module may further include a first inner case in which the first group of hollow fiber membranes is disposed, and a second inner case in which the second group of hollow fiber membranes is disposed, the fixing layer may include a first fixing layer in which ends of the first group of hollow fiber membranes are potted, a second fixing layer in which ends of the second group of hollow fiber membranes are potted, and a third fixing layer adhered to the inner body of the composite gasket while surrounding the first and second fixing layers, an end of the first inner case may be potted in the first fixing layer, and an end of the second inner case may be potted in the second fixing layer.

In accordance with another aspect of the present disclosure, there is provided a method of manufacturing a humidifier for a fuel cell, the method including preparing a hollow fiber membrane cartridge having a first fixing layer in which ends of a plurality of hollow fiber membranes are potted, inserting the hollow fiber membrane cartridge into a mid-case open at opposite ends thereof, preparing a composite gasket having a groove corresponding to the end of the mid-case, mounting the composite gasket on the end of the mid-case such that the end of the mid-case is inserted into the groove, forming a second fixing layer configured to fill a gap between the mid-case and an end of the hollow fiber membrane cartridge and a gap between the composite gasket and the end of the hollow fiber membrane cartridge, simultaneously cutting the first fixing layer, the second fixing layer, and the hollow fiber membranes to open the ends of the hollow fiber membranes, and fastening a cap to the mid-case such that the composite gasket is compressed by the cap, wherein the composite gasket includes an inner body based on the groove, the inner body being located inside the mid-case based on the groove, an outer body based on the groove, the outer body being located outside the mid-case, and a connecting body located between the inner body and the outer body, the connecting body being formed of a first material, and at least a portion of the inner body is formed of a second material different from the first material.

The inner body may include a first part directly connected to the connecting body, the first part being formed of the first material, and a second part adhered to the first part and to the fixing layer, the second part being formed of the second material.

The first part of the inner body may constitute a packing part formed of the first material together with the outer body and the connecting body, and the second part of the inner body may constitute a bracket part formed of the second material.

The preparing the composite gasket may include preparing the bracket part, inserting the bracket part into a mold, injecting a melt of the first material into the mold in which the bracket part is located, and cooling the melt of the first material to obtain the packing part adhered to the bracket part.

Alternatively, the preparing the composite gasket may include performing a co-injection molding to simultaneously form the bracket part and the packing part.

The preparing the hollow fiber membrane cartridge may include inserting at least a portion of each of the hollow fiber membranes into an inner case and performing a dip casting process or a centrifugal casting process to form the first fixing layer.

An end of the inner case may also be potted in the first fixing layer together with the ends of the hollow fiber membranes when the dip casting process or the centrifugal casting process is performed.

The general description of the present disclosure given above is provided merely to illustrate or describe the present disclosure, and does not limit the scope of rights of the present disclosure.

Advantageous Effect

According to the present disclosure, it is possible to effectively prevent both external leakage and internal leakage only through mechanical assembly of a composite gasket without conventional sealant application and hardening processes. According to the present disclosure, therefore, workability is improved and manufacturing time is reduced, whereby it is possible to remarkably improve productivity thereof, since the sealant application process and the sealant hardening process, which are required in the conventional art, are omitted.

In addition, a separate space for storing a half-finished product for the sealant hardening process is not required, whereby it is possible to reduce production cost of a humidifier.

DESCRIPTION OF DRAWINGS

The accompanying drawings, which are included to assist in understanding of the present disclosure and are incorporated in and constitute a part of the present specification, illustrate embodiments of the present disclosure and serve to explain the principle of the present disclosure together with the detailed description of the present disclosure.

BEST MODE

Hereinafter, embodiments of the present disclosure will be described in detail with reference to the accompanying drawings. However, the following embodiments are illustratively provided merely for clear understanding of the present disclosure and do not limit the scope of the present disclosure.

FIGS. 2, 5, 6, and 7A to 7F are sectional views showing an end of a humidifier or a half-finished product, and the other end thereof has a substantially identical (or symmetrical) section.

Figure 1:
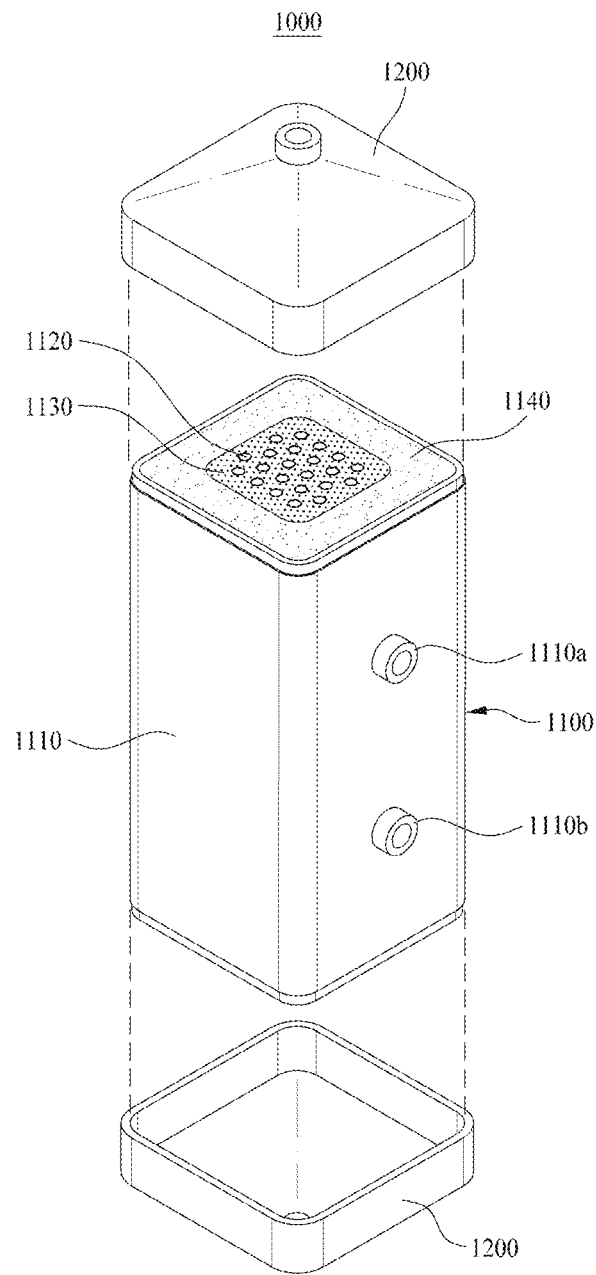
FIG. 1 is an exploded perspective view of a conventional humidifier for a fuel cell.
Figure 2:
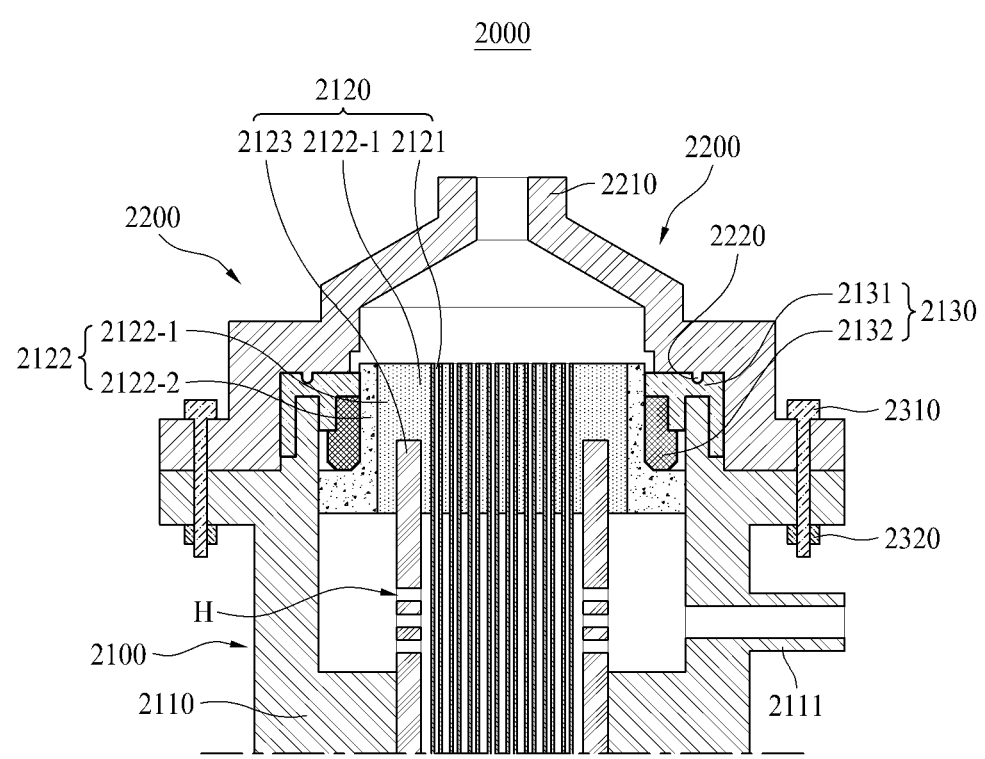
FIG. 2 is a sectional view of a humidifier according to a first embodiment of the present disclosure.

As illustrated in FIG. 2, a humidifier 2000 for a fuel cell according to the present disclosure includes a humidifying module 2100 configured to humidify gas supplied from the outside using moisture in off-gas discharged from a fuel cell stack. Opposite ends of the humidifying module 2100 are coupled to caps 2200, respectively.

One of the caps 2200 receives gas from the outside through a port 2210 and transmits the gas to the humidifying module 2100, and the other cap transmits gas humidified by the humidifying module 2100 to the fuel cell stack through a port 2210. Each of the caps 2200 may be formed of rigid plastic (e.g. polycarbonate, polyamide (PA), or polyphthalamide (PPA)) or metal, and may have a simple closed curve-shaped (e.g. circular or polygonal) traverse section.

The humidifying module 2100 according to the embodiment of the present disclosure, in which moisture exchange is performed between gas supplied from the outside and off-gas supplied from the fuel cell stack, includes a mid-case 2110 open at opposite ends thereof, a plurality of hollow fiber membranes 2121 disposed in the mid-case 2110, a fixing layer 2122 in which ends of the hollow fiber membranes 2121 are potted, and a composite gasket 2130 having a groove into which the end of the mid-case 2110 is inserted.

The mid-case 2110 has ports 2111 for off-gas introduction/discharge (only one is shown in FIG. 2). The mid-case 2110 may be formed of rigid plastic (e.g. polycarbonate, polyamide (PA), or polyphthalamide (PPA)) or metal, and may have a simple closed curve-shaped (e.g. circular or polygonal) traverse section. According to the embodiment of the present disclosure, the mid-case 2110 may have the same traverse section as the cap 2200.

Each of the hollow fiber membranes 2121 may include a polymer membrane formed of polysulfone resin, polyethersulfone resin, sulfonated polysulfone resin, polyvinylidene fluoride (PVDF) resin, polyacrylonitrile (PAN) resin, polyimide resin, polyamide imide resin, polyester imide resin, or a mixture of two or more thereof.

Gas supplied from the outside through one cap 2200 is humidified while flowing along hollow parts of the hollow fiber membranes 2121, and is transmitted to the fuel cell stack through the other cap 2200.

Off-gas introduced into the mid-case 2110 comes into contact with the outer surfaces of the hollow fiber membranes 2121, and is discharged from the mid-case 211. When the off-gas comes into contact with the outer surfaces of the hollow fiber membranes 2121, moisture contained in the off-gas is transmitted through the hollow fiber membranes 2121 to humidify gas flowing along the hollow parts of the hollow fiber membranes 2121.

The fixing layer 2122, which may be formed of hard or soft polyurethane resin, must isolate an inner space of the cap 2200 from an inner space of the mid-case 2110 such that the cap 2200 fluidly communicates with only the hollow fiber membranes 2121.

As previously described, however, (i) the fixing layer 2122 is alternately expanded and contracted as a result of repeated operation and stop of a fuel cell, whereby the fixing layer 2122 is separated from the mid-case 2110 due to a difference in coefficient of thermal expansion between the mid-case 2110 and the fixing layer 2122, and therefore a gap is generated therebetween, or (ii) there is a high probability of a gap being generated between the fixing layer 2122 and the mid-case 2110 due to vibration and/or impact. The gap between the fixing layer 2122 and the mid-case 2110 causes gas leakage, thereby reducing power generation efficiency of the fuel cell.

Gas leakage that may be caused by generation of the gap between the fixing layer 2122 and the mid-case 2110 includes (i) external leakage by which off-gas in the inner space of the mid-case 2110 sequentially passes through the gap between the fixing layer 2122 and the mid-case 2110 and a gap between the cap 2200 and the mid-case 2110 and is then discharged out of the humidifier 2000 and (ii) internal leakage by which off-gas in the inner space of the mid-case 2110 sequentially passes through the gap between the fixing layer 2122 and the mid-case 2110 and a gap between the fixing layer 2122 and the cap 2200 and is then introduced into the inner space of the cap 2200.

In order to prevent gas leakage due to generation of the gap between the fixing layer 2122 and the mid-case 2110, the humidifier 2000 for a fuel cell according to the present disclosure further includes the composite gasket 2130.

Figure 3:
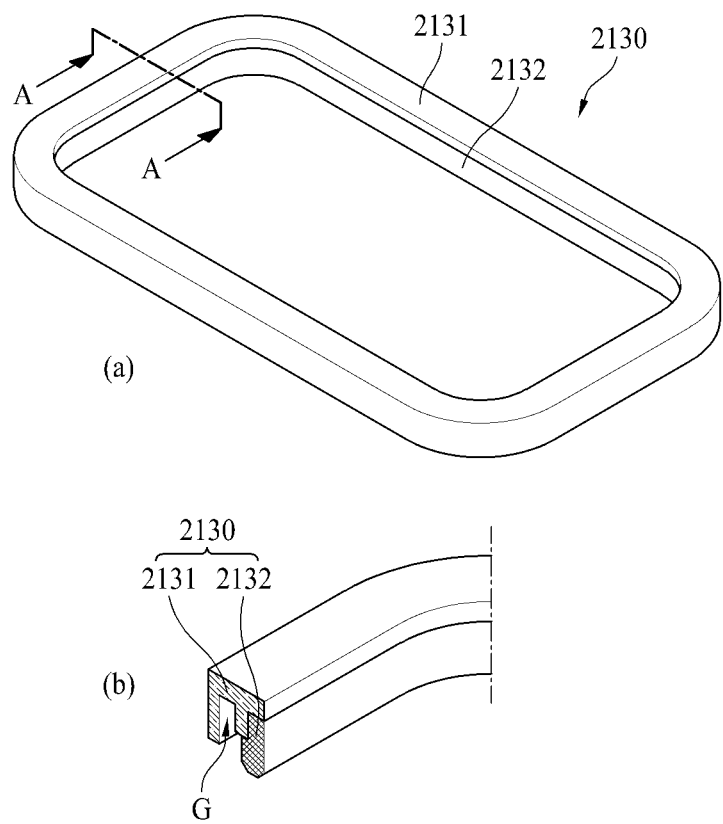
FIG. 3(a) is a perspective view of a composite gasket according to an embodiment of the present disclosure.
FIG. 3(b) is a sectional view taken along line A-A of FIG. 3(a)

As illustrated in FIG. 3(a), the composite gasket 2130 may have a simple closed curve shape corresponding to the traverse section of the mid-case 2110.

As illustrated in FIG. 3(b), which is a sectional view taken along line A-A of FIG. 3(a), the composite gasket 2130 may have a groove G into which the end of the mid-case 2110 is inserted, and may include a packing part 2131 and a bracket part 2132, the packing part 2131 and the bracket part 2132 being formed of different materials.

FIGS. 4(a) to 4(f) are sectional views of composite gaskets 2130 according to various embodiments of the present disclosure.

Figure 4:
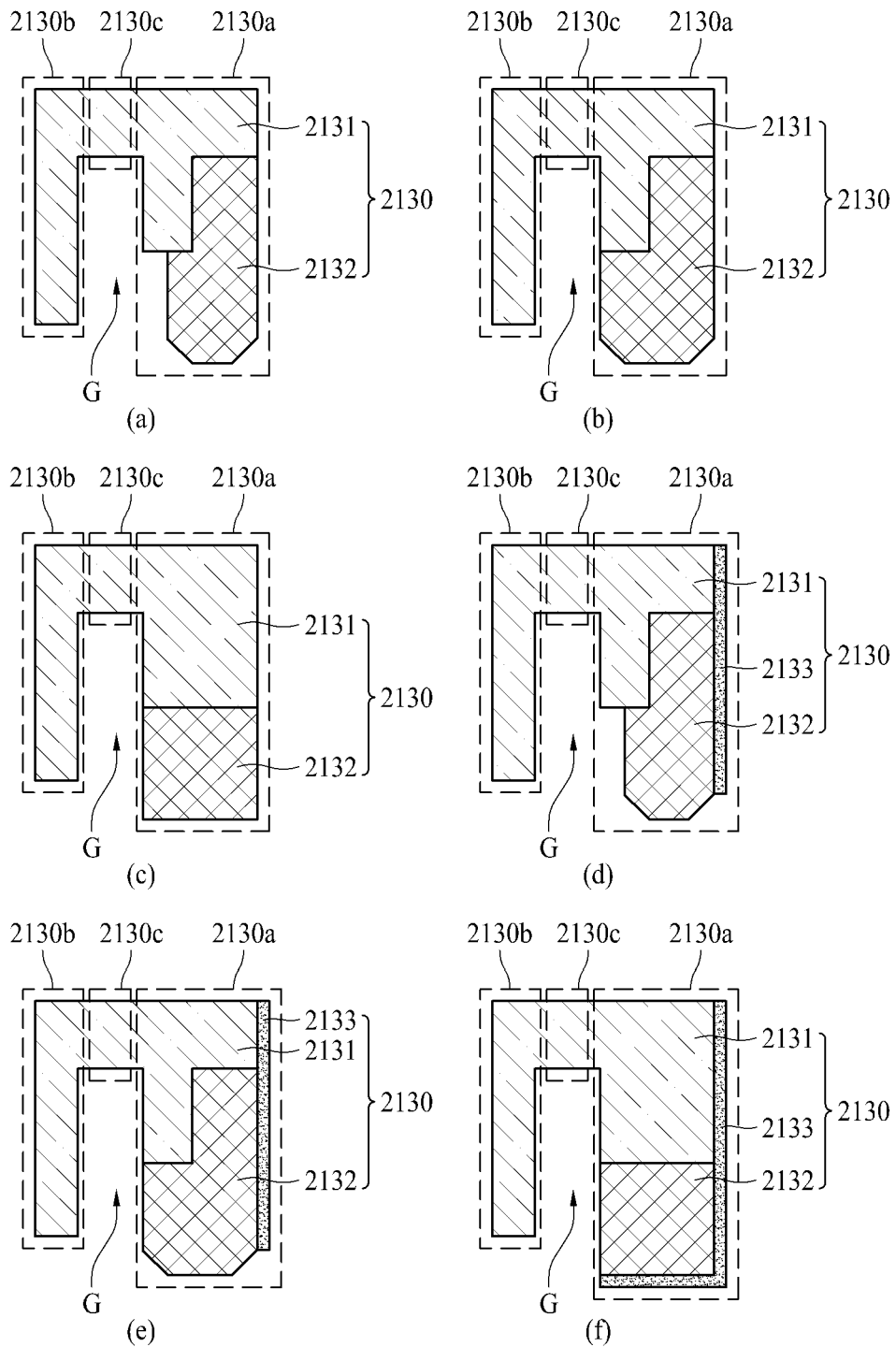
FIGS. 4(a) to 4(f) are sectional views of composite gaskets according to various embodiments of the present disclosure.

Referring to FIGS. 4(a) to 4(c), the composite gasket 2130 according to the present disclosure includes an inner body 2130a based on a groove G into which the end of the mid-case 2110 is inserted, the inner body 2130a being located inside the mid-case 2110, an outer body 2130b based on the groove G, the outer body 2130b being located outside the mid-case 2110, and a connecting body 2130c located between the inner body 2130a and the outer body 2130b, the connecting body being formed of a first material.

According to the present disclosure, at least a portion of the inner body 2130a is formed of a second material, which is different from the first material.

According to the embodiment of the present disclosure, the second material may be a material that exhibits higher adhesive force with respect to the fixing layer 2122 than the first material, and the portion of the inner body 2130a that is formed of the second material may be strongly adhered to the fixing layer 2122.

For example, the connecting body 2130c of the composite gasket 2130 may be formed of a first material (e.g. soft rubber) that has a relatively low hardness of 30 to 60 Shore A, more preferably 40 to 50 Shore A, so as to be compressed by pressure applied when the cap 2200 is fastened to the mid-case 2110 through a bolt 2310 and a nut 2320, and the portion of the inner body 2130a that comes into direct contact with the fixing layer 2122 may be formed of a material (e.g. metal, rigid plastic, hard rubber, or soft rubber) that exhibits higher adhesive force with respect to the fixing layer 2122 than the first material.

The first material of the connecting body 2130c may include soft silicone rubber or soft urethane rubber, and the second material of the inner body 2130a may include polypropylene (PP), polyethylene terephthalate (PET), polystyrene (PS), polycarbonate (PC), acrylic resin, hard silicone, or hard urethane.

In addition, when the first material of the connecting body 2130c includes soft silicone rubber, the second material of the inner body 2130a may include soft urethane rubber.

As shown respectively in FIGS. 4(a) to 4(c), the inner body 2130a may include (i) a first part directly connected to the connecting body 2130c, the first part being formed of the first material, and (ii) a second part adhered to the first part and to the fixing layer 2122, the second part being formed of the second material.

In order to increase contact area between the first and second parts, which are formed of different materials, thereby maximizing the adhesive force therebetween, the interface between the first and second parts may have a step, as illustrated in FIGS. 4(a) and 4(b).

Together with the outer body 2130b and the connecting body 2130c, the first part of the inner body 2130a may constitute a packing part 2131 formed of the first material. The second part of the inner body 2130a may constitute a bracket part 2132 formed of the second material. The packing part 2131 and the bracket part 2132 may be integrally formed through injection molding, a detailed description of which will follow.

When the cap 2200 is fastened to the mid-case 2110 through the bolt 2310 and the nut 2320, the connecting body 2130c of the composite gasket 2130 is pressurized and compressed by the end of the mid-case 2110 and the cap 2200, whereby movement of gas through the interface between the composite gasket 2130 and the mid-case 2110 (i.e. external leakage) can be prevented, and therefore tight external sealing may be guaranteed.

In addition, since the packing part 2131 and the bracket part 2132 are integrally formed through injection molding, strong adhesive force therebetween may be obtained. Consequently, movement of gas through the interface between the packing part 2131 and the bracket part 2132 (i.e. through the interface between the first and second parts of the inner body 2130a) (i.e. internal leakage) can be prevented, and therefore excellent internal sealing may be guaranteed.

In addition, since the bracket part 2132 (i.e. the second part of the inner body 2130a) according to the embodiment of the present disclosure has excellent adhesive force with respect to the fixing layer 2122, movement of gas through the interface between the bracket part 2132 and the fixing layer 2122 (i.e. internal leakage) can be prevented, and therefore stronger internal sealing may be provided.

Optionally, the surface of the bracket part 2132 or the surface of the inner body 2130a may be treated with a primer, whereby the adhesive strength between the bracket part 2132 or the inner body 2130a and the fixing layer 2122 can be further increased, and therefore an internal sealing effect may be maximized. That is, as illustrated in FIGS. 4(d) to 4(f), the composite gasket 2130 according to the present disclosure further includes a primer layer 2133 formed on at least a portion of the surface of the inner body 2130a, whereby the composite gasket may have stronger adhesive force with respect to the fixing layer 2122. The primer used to increase the adhesive strength between the composite gasket 2130 and the fixing layer 2122 may include a rubber adhesive component, an acrylic adhesive component, a polyurethane adhesive component, an epoxy adhesive component, a silicone adhesive component, a polyamide-based adhesive component, a polyimide-based adhesive component, or a mixture of two or more thereof.

For the rubber adhesive component, natural rubber (NR) and/or synthetic rubber may be used. The synthetic rubber may be SBR, NBR, CR, BR, IIR, and/or EPDM.

For the acrylic adhesive component, acrylic emulsion, anaerobic acrylic resin, and/or acrylic resin-based adhesive tape may be used.

For the polyurethane adhesive component, solvent-type polyurethane, polyurethane hot melt, or urethane emulsion may be used.

For the polyamide-based adhesive component, polyamide hot melt may be used.

As illustrated in FIG. 2, the cap 2200 according to the embodiment of the present disclosure may have a protrusion 2220 formed at a position corresponding to the end of the mid-case 2110 inserted into the groove G of the composite gasket 2130. The protrusion 2220 more effectively compresses the connecting body 2130c of the composite gasket 2130 together with the end of the mid-case 2110, whereby tighter external sealing is achieved.

As illustrated in FIG. 2, the first part of the inner body 2130a of the composite gasket 2130 may also be adhered to the fixing layer 2122, in addition to the second part thereof. Liquid resin (e.g. liquid polyurethane resin) used to form the fixing layer 2122 is hardened in a state of being in contact with both the first and second parts of the inner body 2130a of the composite gasket 2130, whereby the adhesive strength between the gasket 2130 and the fixing layer 2122 can be increased and thus internal sealing may be improved.

According to the embodiment of the present disclosure, as illustrated in FIG. 2, the fixing layer 2122 may include a first fixing layer 2122-1 in which the ends of the hollow fiber membranes 2121 are potted, and a second fixing layer 2122-2 adhered to the inner body 2130a of the composite gasket 2130 while surrounding the first fixing layer 2122-1.

Each of the first fixing layer 2122-1 and the second fixing layer 2122-2 may be formed by hardening liquid resin, such as liquid polyurethane resin, using a dip casting method or a centrifugal casting method. Although the first fixing layer 2122-1 and the second fixing layer 2122-2 may be formed of different materials, it may be preferable for the first fixing layer and the second fixing layer to be formed of the same material (e.g. polyurethane resin) in terms of adhesive strength therebetween.

As illustrated in FIG. 2, the humidifying module 2100 may further include an inner case 2123 disposed in the mid-case 2110, the inner case being open at opposite ends thereof. In this case, the hollow fiber membranes 2121 are disposed in the inner case 2123. The first fixing layer 2122-1 in which ends of the hollow fiber membranes 2121 are potted closes a corresponding one of the open ends of the inner case 2123.

According to the embodiment of the present disclosure, the inner case 2123 has a plurality of holes H provided at positions corresponding to the ports 2111 for off-gas introduction/discharge (only one is shown in FIG. 2). Off-gas introduced into the mid-case 2110 through the first port 2111 passes through the first holes H and then absorbs moisture while flowing along the outer surfaces of the hollow fiber membranes 2121. Subsequently, the off-gas exits the inner case 2123 through the second holes H on the opposite side and is then discharged from the mid-case 2110 through the second port 2111.

The hollow fiber membranes 2121, the first fixing layer 2122-1, and the inner case 2123 constitute a hollow fiber membrane cartridge 2120.

As illustrated in FIG. 2, an end of the inner case 2123 is potted in the first fixing layer 2122-1, whereby relative positions of the hollow fiber membranes 2121 and the inner case 2123 may be uniformly maintained.

Figure 5:
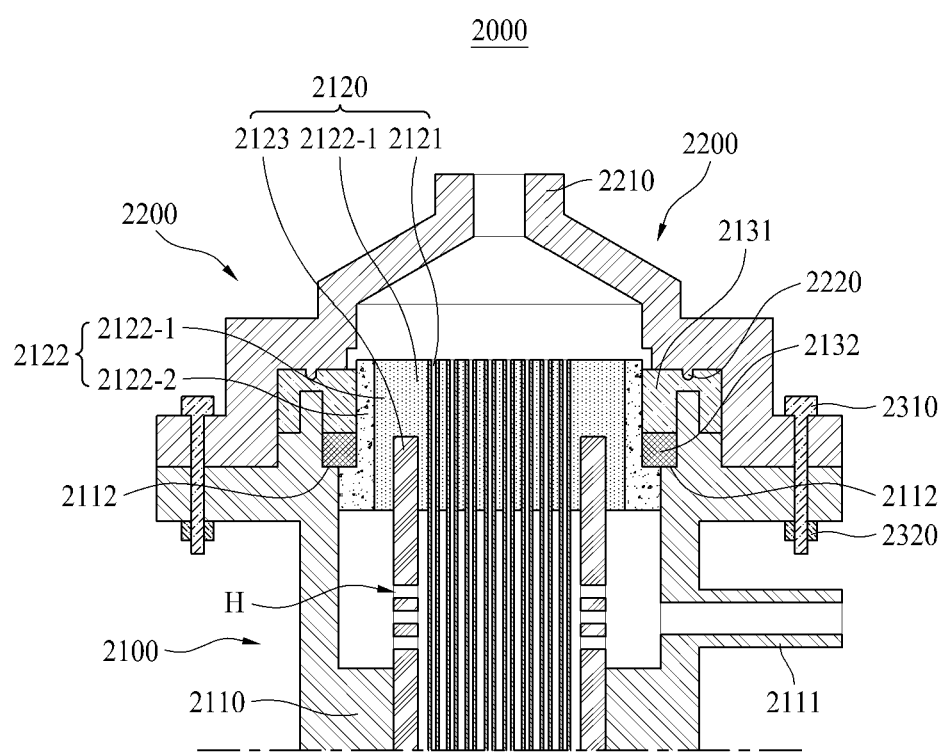
FIG. 5 is a sectional view of a humidifier according to a second embodiment of the present disclosure.

Hereinafter, a humidifier 2000 for a fuel cell according to a second embodiment of the present disclosure will be described with reference to FIG. 5.

The humidifier 2000 for a fuel cell according to the second embodiment of the present disclosure is identical to the humidifier 2000 for a fuel cell of FIG. 2 except that the mid-case 2110 has a step 2112 formed on the inner circumferential surface thereof and the composite gasket 2130 (more specifically, the bracket part 2132) is supported by the step 2112.

Since the bracket part 2132 is supported by the step 2112 of the mid-case 2110 and has higher hardness than the packing part 2131, the bracket part 2132 may effectively apply pressure to the packing part 2131 together with the cap 2200 when the cap 2200 is fastened to the mid-case 2110 through the bolt 2310 and the nut 2320. Consequently, movement of gas through the interface between the packing part 2131 and the bracket part 2132 (i.e. through the interface between the first and second parts of the inner body 2130a) (i.e. internal leakage) can be prevented, and therefore excellent internal sealing may be guaranteed.

In addition, as illustrated in FIG. 4(f), when at least a portion of the surface of the inner body 2130a of the composite gasket 2130 is treated with a primer, not only the surface of the inner body to come into contact with the fixing layer 2122 but also the surface of the inner body to be supported by the step 2112 are treated with the primer, whereby the adhesive strength between the inner body 2130a and the fixing layer 2122 can be further increased, and therefore an internal sealing effect may be maximized. Furthermore, the adhesive strength between the inner body 2130a and the step 2112 can be further increased, and therefore an external sealing effect may be maximized.

Hereinafter, a humidifier 2000 for a fuel cell according to a third embodiment of the present disclosure will be described with reference to FIG. 6.

Figure 6:
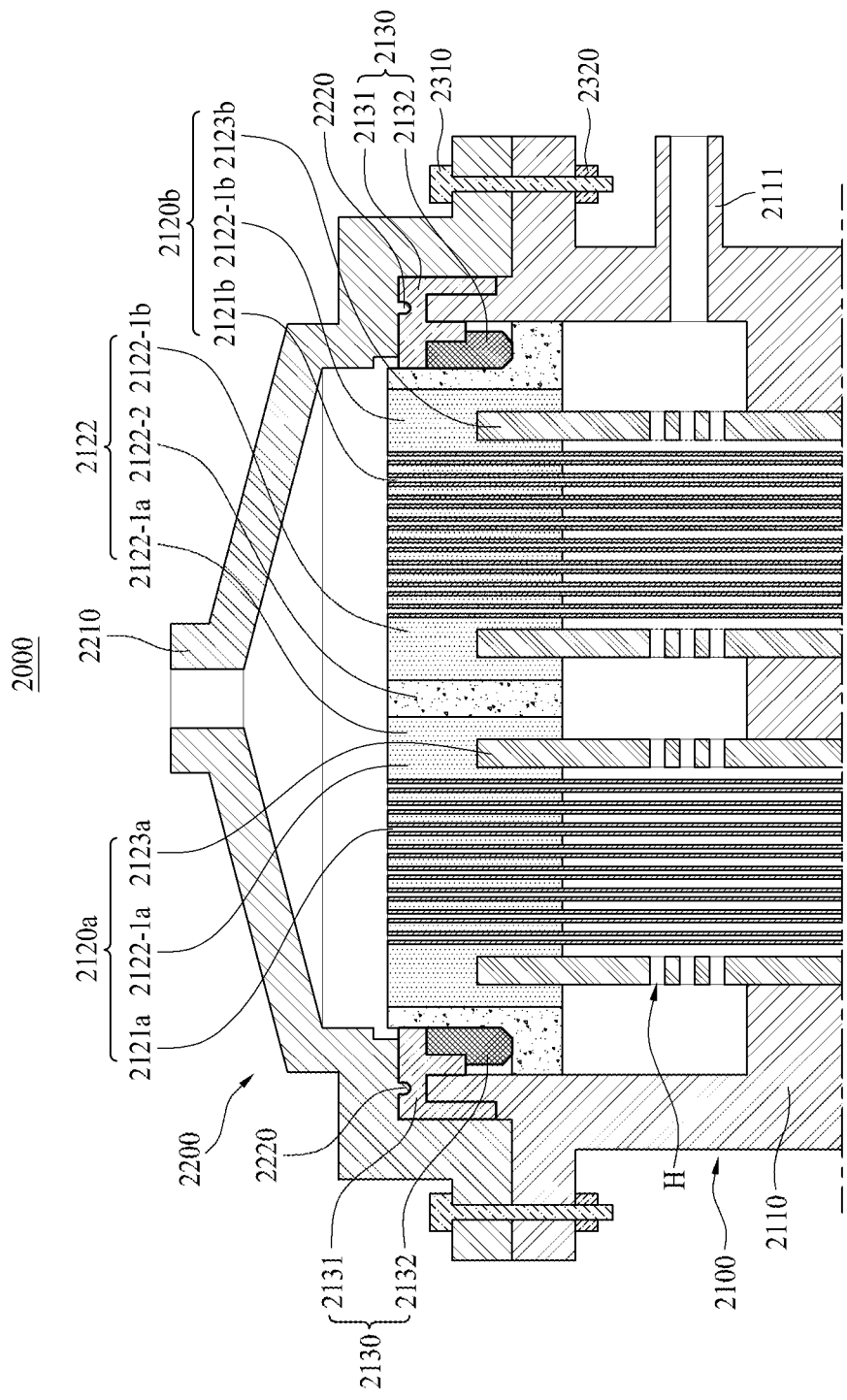
FIG. 6 is a sectional view of a humidifier according to a third embodiment of the present disclosure.

As illustrated in FIG. 6, the humidifier 2000 for a fuel cell according to the third embodiment of the present disclosure is substantially identical to the first embodiment described above except that the humidifier includes two hollow fiber membrane cartridges 2120a and 2120b.

That is, according to the third embodiment of the present disclosure, the hollow fiber membranes include a first group of hollow fiber membranes 2121a and a second group of hollow fiber membranes 2121b, the humidifying module 2100 includes a first inner case 2123a in which the first group of hollow fiber membranes 2121a is disposed and a second inner case 2123b in which the second group of hollow fiber membranes 2121b is disposed, and the fixing layer 2122 includes a first fixing layer 2122-1a in which ends of the first group of hollow fiber membranes 2121a are potted, a second fixing layer 2122-1b in which ends of the second group of hollow fiber membranes 2121b are potted, and a third fixing layer 2122-2 adhered to the inner body 2130a of the composite gasket 2130 while surrounding the first and second fixing layers 2122-1a and 2122-1b.

The first group of hollow fiber membranes 2121a, the first fixing layer 2122-1a, and the first inner case 2123a constitute a first hollow fiber membrane cartridge 2120a, and the second group of hollow fiber membranes 2121b, the second fixing layer 2122-1b, and the second inner case 2123b constitute a second hollow fiber membrane cartridge 2120b.

As illustrated in FIG. 6, ends of the first and second inner cases 2123a and 2123b are potted in the first and second fixing layers 2122-1a and 2122-1b, respectively, whereby relative positions of the first group of hollow fiber membranes 2121a and the first inner case 2123a and relative positions of the second group of hollow fiber membranes 2121b and the second inner case 2123b may be uniformly maintained.

In order to increase humidification capacity, the number of hollow fiber membranes 2121 must be increased. However, in the first and second embodiments, each of which includes only a single hollow fiber membrane cartridge 2120, there is a problem in that, if the number of hollow fiber membranes 2121 is increased, it is difficult for off-gas to be transmitted to hollow fiber membranes 2121 located at the center.

In the third embodiment of the present disclosure, by contrast, two hollow fiber membrane cartridges 2120a and 2120b are disposed spaced apart from each other, whereby, even though the number of hollow fiber membranes 2121a and 2121b is increased, off-gas may be relatively uniformly transmitted to the hollow fiber membranes 2121a and 2121b. That is, on the assumption that the number of hollow fiber membranes is uniform, the structure of the third embodiment, which includes two hollow fiber membrane cartridges 2120a and 2120b, is advantageous in terms of utilization of the hollow fiber membranes, compared to the structures of the first and second embodiments, each of which includes a single hollow fiber membrane cartridge 2120.

The number of hollow fiber membrane cartridge(s) mounted in the mid-case 2110 may be determined in overall consideration of the capacity of the fuel cell (or required humidification capacity), the size of the humidifier, and the weight of the humidifier.

Hereinafter, a method of manufacturing a humidifier 2000 for a fuel cell according to an embodiment of the present disclosure will be described in more detail with reference to FIGS. 7A to 7F.

Figure 7A:
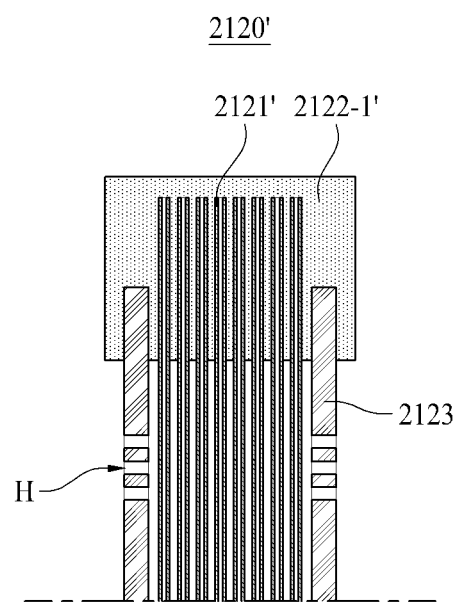
FIGS. 7A to 7F are sectional views explaining a humidifier manufacturing method according to an embodiment of the present disclosure.

First, as illustrated in FIG. 7A, a hollow fiber membrane cartridge 2120' having a first fixing layer 2122-1' in which ends of a plurality of hollow fiber membranes 2121' are potted is prepared.

The hollow fiber membrane cartridge 2120' may be manufactured by inserting at least a portion of each of the hollow fiber membranes 2121' into an inner case 2123 and performing a dip casting process or a centrifugal casting process using liquid resin, such as liquid polyurethane resin. The first fixing layer 2122-1' in which the ends of the hollow fiber membranes 2121' are potted is formed as a result of hardening of the liquid resin.

When the dip casting process or the centrifugal casting process is performed, an end of the inner case 2123 may be potted in the first fixing layer 2122-1' together with the ends of the hollow fiber membranes 2121'.

The inner case 2123 may have first and second groups of holes H formed in a longitudinal direction thereof so as to be located on opposite sides.

Figure 7B:
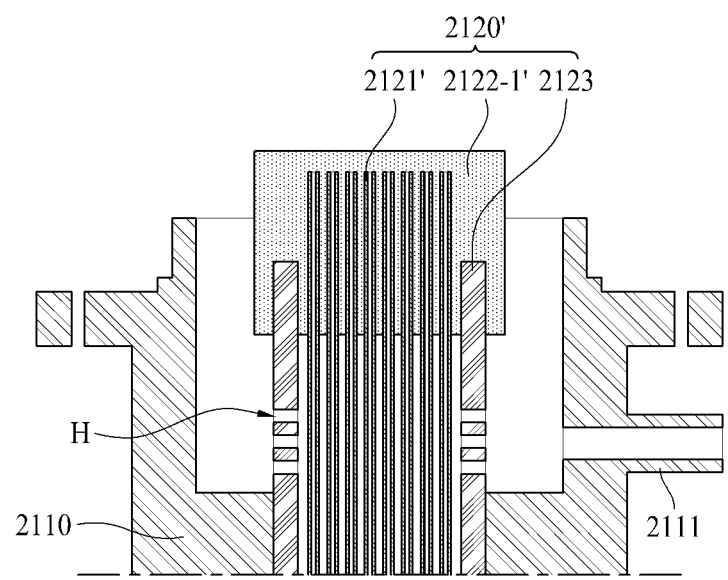

Subsequently, as illustrated in FIG. 7B, the hollow fiber membrane cartridge 2120' is inserted into a mid-case 2110 open at opposite ends thereof.

According to the embodiment of the present disclosure, the mid-case 2110 has a simple closed curve-shaped traverse section. The mid-case 2110 may have a partition wall configured to divide an inner space thereof into an off-gas introduction space and an off-gas discharge space located on opposite sides in a longitudinal direction, and the hollow fiber membrane cartridge 2120' may be inserted through a hole formed in the partition wall so as to be supported by the partition wall. At this time, the first group of holes H of the inner case 2123 is located in the off-gas introduction space, and the second group of holes H of the inner case 2123 is located in the off-gas discharge space.

In this case, off-gas that has entered the off-gas introduction space is introduced into the inner case 2123 through the first group of holes H, flows toward the second group of holes H in the inner case 2123, moves to the off-gas discharge space through the second group of holes H, and is discharged from the mid-case 2110.

Figure 7C:
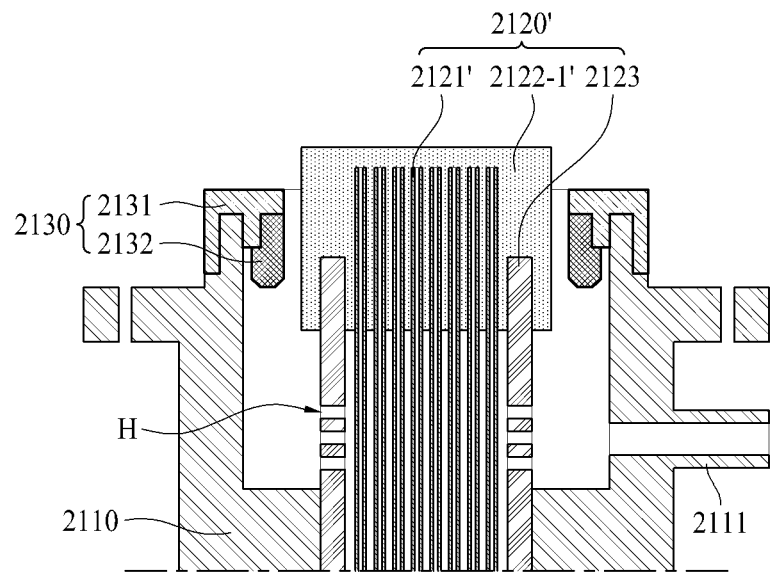

Subsequently, as shown in FIG. 7C, a composite gasket 2130 having a groove G corresponding to the end of the mid-case 2110 is prepared, and the composite gasket 2130 is mounted on the end of the mid-case 2110 such that the end of the mid-case 2110 is inserted into the groove G.

The composite gasket 2130 may be obtained by (i) preparing a bracket part 2132 formed of the second material, (ii) inserting the bracket part 2132 into a mold, (iii) injecting a melt of the first material into the mold in which the bracket part 2132 is located, and (iv) cooling the melt of the first material to obtain a packing part 2131 adhered to the bracket part 2132. Optionally, the surface of the bracket part 2132 may be treated with a primer and may then be inserted into the mold in order to increase the adhesive strength between the bracket part 2132 and the packing part 2131.

Alternatively, a co-injection molding may be performed in order to simultaneously form the bracket part 2132 and the packing part 2131.

As previously described, at least a portion of the surface of an inner body 2130*a* of the composite gasket 2130 obtained through the above processes may be treated with the primer.

According to the embodiment of the present disclosure, the packing part 2131 and the bracket part 2132 are integrally formed through injection molding, whereby it is possible to obtain strong adhesive force therebetween even though the packing part and the bracket part are formed of different materials. Consequently, movement of gas through the interface between the packing part 2131 and the bracket part 2132 (i.e. internal leakage) can be prevented, and therefore excellent internal sealing may be guaranteed.

Figure 7D:
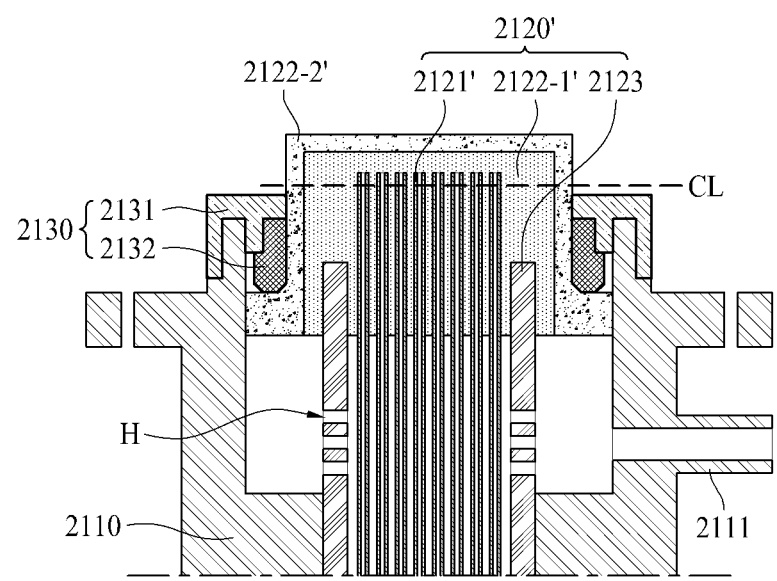

Subsequently, as shown in FIG. 7D, a second fixing layer 2122-2' configured to fill the gap between the mid-case 2110 and the end of the hollow fiber membrane cartridge 2120' and the gap between the composite gasket 2130 and the end of the hollow fiber membrane cartridge 2120' is formed.

The second fixing layer 2122-2' may be manufactured by fastening a potting cap (not shown) to the mid-case 2110, performing a dip casting process of injecting liquid resin, such as liquid polyurethane resin, into the potting cap and hardening the liquid resin in the state in which the potting cap is located under the mid-case 2110, and removing the potting cap. Alternatively, the second fixing layer 2122-2' may be formed through a centrifugal casting process.

Although the first and second fixing layers 2122-1' and 2122-2' may be formed of different liquid resins, it may be preferable for the first and second fixing layers to be formed of the same material (e.g. liquid polyurethane resin) in terms of adhesive strength therebetween.

According to the embodiment of the present disclosure, liquid resin (e.g. liquid polyurethane resin) used to form the second fixing layer 2122-2' may be hardened in while being in contact with the composite gasket 2130 (particularly, the bracket part 2132), whereby the adhesive strength of the second fixing layer 2122-2' with respect to it can be increased and thus internal sealing may be improved.

According to the embodiment of the present disclosure, since the bracket part 2132 is formed of a material that has excellent adhesive force with respect to the second fixing layer 2122-2', movement of gas through the interface therebetween (i.e. internal leakage) can be prevented, and therefore stronger internal sealing may be provided. In addition, when the surface of the bracket part 2132 is treated with a primer, as previously described, the adhesive strength between the bracket part 2132 and the second fixing layer 2122-2' can be maximized, and therefore better internal sealing may be provided.

Figure 7E:
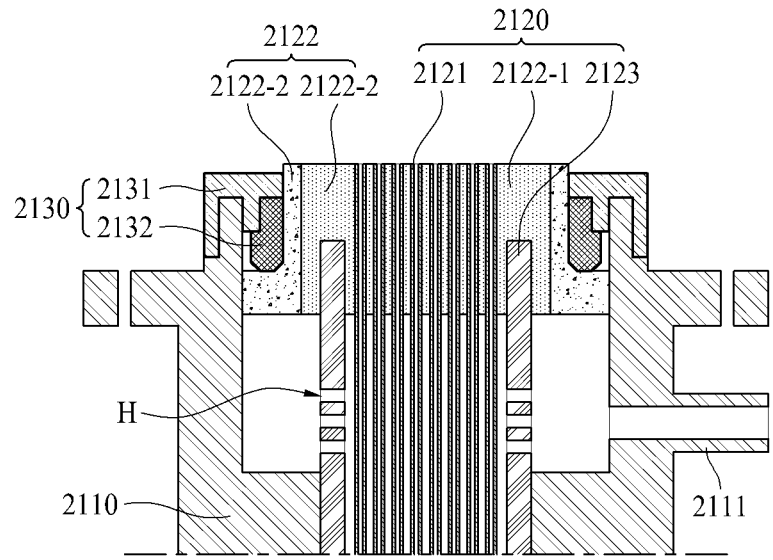

Subsequently, the first fixing layer 2122-1', the second fixing layer 2122-2', and the hollow fiber membranes 2121' are simultaneously cut along a cutting line CL of FIG. 7D, whereby hollow fiber membranes 2121 configured such that ends thereof potted in a first fixing layer 2122-1 surrounded by a second fixing layer 2122-2 are open are obtained, as illustrated in FIG. 7E.

Figure 7F:
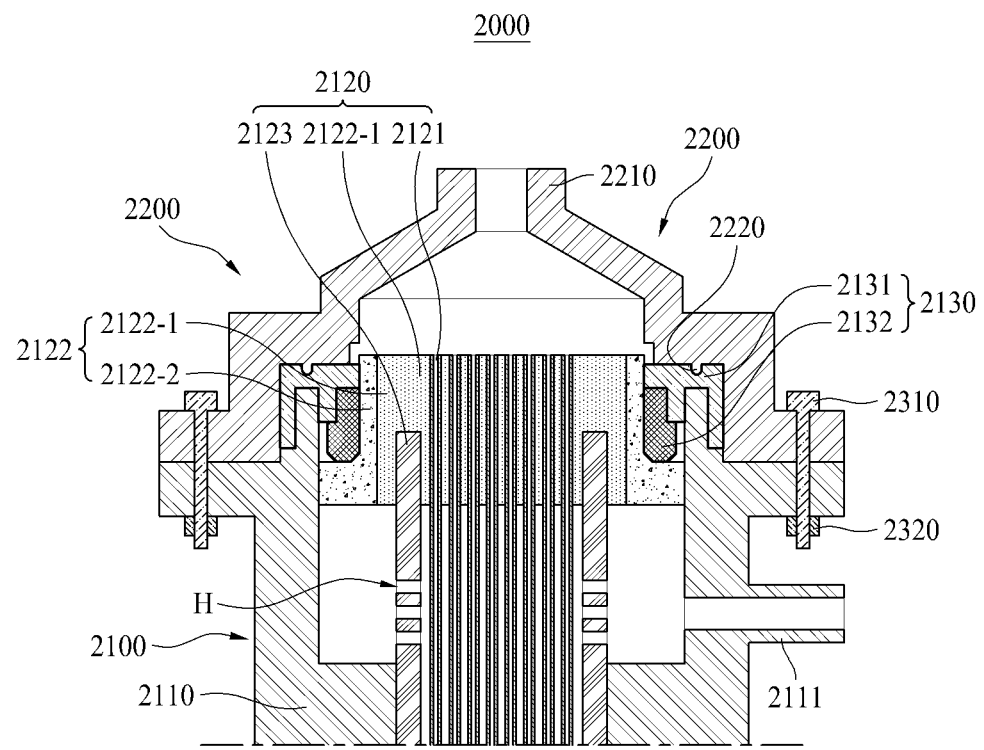

Subsequently, as illustrated in FIG. 7F, a cap 2200 is fastened to the mid-case 2110. Specifically, the cap 2200 is fastened to the mid-case such that a connecting body 2130*c* of the composite gasket 2130 is compressed by the cap 2200.

As illustrated in FIG. 7F, the cap 2200 according to the embodiment of the present disclosure may have a protrusion 2220 formed at a position corresponding to the end of the mid-case 2110. Since the end of the mid-case 2110 is inserted into the groove G of the composite gasket 2130, the protrusion 2220 more effectively compresses the connecting body 2130*c* of the composite gasket 2130 together with the end of the mid-case 2110, whereby tighter external sealing is achieved.

According to the present disclosure described above, it is possible to effectively prevent both the external leakage and the internal leakage only through mechanical assembly of the composite gasket 2130 without conventional sealant application and hardening processes. According to the present disclosure, therefore, workability is improved and manufacturing time is reduced, whereby it is possible to remarkably improve productivity thereof, since the sealant application process and the sealant hardening process, which are required in the conventional art, are omitted. In addition, a separate space for storing a half-finished product during the sealant hardening process is not required, whereby it is possible to reduce production cost of the humidifier.

The invention claimed is:

1. A humidifier for a fuel cell, the humidifier comprising:
   a humidifying module configured to humidify gas supplied from outside using moisture in off-gas discharged from a fuel cell stack; and
   caps coupled respectively to opposite ends of the humidifying module,
   wherein the humidifying module comprises:
   a mid-case open at opposite ends thereof;
   a plurality of hollow fiber membranes disposed in the mid-case;
   a fixing layer in which ends of the hollow fiber membranes are potted; and
   a composite gasket having a groove into which the end of the mid-case is inserted,
   wherein the composite gasket comprises:
   an inner body based on the groove, the inner body being located inside the mid-case;
   an outer body based on the groove, the outer body being located outside the mid-case; and
   a connecting body located between the inner body and the outer body, the connecting body being formed of a first material,
   wherein at least a portion of the inner body is adhered to the fixing layer and is formed of a second material different from the first material,
   wherein the inner body comprises:
   a first part directly connected to the connec a bei g fc ned of the first material; and
   a second part adhered to the first part and to the fixing laver, the second part being formed the second material,
   wherein, together with the outer body and the connecting body, the first part of the inner body constitutes a packing part formed of the first material,
   wherein the second part of the inner body constitutes a bracket part formed of the second material, and
   wherein the packing part and the bracket part are integrally formed through injection molding.

2. The humidifier according to claim 1, wherein
   the first material is soft rubber, and
   the second material is metal, rigid plastic, hard rubber, or a different kind of soft rubber from the first material.

3. The humidifier according to claim 1, wherein
the first material comprises soft silicone rubber or soft urethane rubber, and
the second material comprises polypropylene (PP), polyethylene terephthalate (PET), polystyrene (PS), polycarbonate (PC), acrylic resin, hard silicone, or hard urethane.

4. The humidifier according to claim 1, wherein
the first material comprises soft silicone rubber, and
the second material comprises soft urethane rubber.

5. The humidifier according to claim 1, wherein an interface between the first and second parts has a step.

6. The humidifier according to claim 1, wherein the fixing layer comprises:
a first fixing layer in which the ends of the hollow fiber membranes are potted; and
a second fixing layer adhered to the inner body of the composite gasket while surrounding the first fixing layer.

7. The humidifier according to claim 6, wherein the first fixing layer and the second fixing layer are formed of an identical material.

8. The humidifier according to claim 6, wherein both the first fixing layer and the second fixing layer comprise polyurethane (PU) resin.

9. The humidifier according to claim 6, wherein
the humidifying module further comprises an inner case disposed in the mid-case, the inner case being open at opposite ends thereof,
the hollow fiber membranes are disposed in the inner case, and
the end of the inner case is potted in the first fixing layer.

10. The humidifier according to claim 1, wherein
the hollow fiber membranes comprise a first group of hollow fiber membranes and a second group of hollow fiber membranes,
the humidifying module further comprises:
a first inner case in which the first group of hollow fiber membranes is disposed; and
a second inner case in which the second group of hollow fiber membranes is disposed,
the fixing layer comprises:
a first fixing layer in which ends of the first group of hollow fiber membranes are potted;
a second fixing layer in which ends of the second group of hollow fiber membranes are potted; and
a third fixing layer adhered to the inner body of the composite gasket while surrounding the first and second fixing layers,
an end of the first inner case is potted in the first fixing layer, and
an end of the second inner case is potted in the second fixing layer.

11. A humidifier for a fuel cell, the humidifier comprising:
a humidifying module configured to humidify gas supplied from outside using moisture in off-gas discharged from a fuel cell stack; and
caps coupled respectively to opposite ends of the humidifying module,
wherein the humidifying module comprises:
a mid-case ope 1 at opposite ends thereof;
a plurality of hollow fiber membranes disposed in the mid-case;
a fixing layer in which ends of the hollow fiber membranes are potted; and
a composite gasket having a groove into which the end of the mid-case is inserted,
wherein the composite gasket comprises:
an inner body based on the groove, the inner body being located inside mid-case,
an outer body based on the groove, the outer body being located outside the mid-case, and
a connecting body located between the inner body and the outer body, the connecting body being formed of a first material,
wherein at least a portion of the inner body is adhered to the fixing layer and is formed of a second material different from the first material,
wherein the inner body comprises:
a first part directly connected to the connecting body, the first part constitutes a packing part and being formed of the first material; and
a second part adhered to the first part and to the fixing layer, the second part constitutes a bracket part and being formed of the second material,
the packing part and the bracket part are integrally formed through injection molding, and
wherein the composite gasket further comprises a primer layer formed on at least a portion of a surface of the inner body, the primer layer comprising a rubber adhesive component, an acrylic adhesive component, a polyurethane adhesive component, an epoxy adhesive component, a silicone adhesive component, a polyamide-based adhesive component, a polyimide-based adhesive component, or a mixture of two or more thereof.

12. A method of manufacturing a humidifier for a fuel cell, the method comprising:
preparing a hollow fiber membrane cartridge having a first fixing layer in which ends of a plurality of hollow fiber membranes are potted;
inserting the hollow fiber membrane cartridge into a mid-case open at opposite ends thereof;
preparing a composite gasket having a groove corresponding to the end of the mid-case;
mounting the composite gasket on the end of the mid-case such that the end of the mid-case is inserted into the groove;
forming a second fixing layer configured to fill a gap between the mid-case and an end of the hollow fiber membrane cartridge and a gap between the composite gasket and the end of the hollow fiber membrane cartridge;
simultaneously cutting the first fixing layer, the second fixing layer, and the hollow fiber membranes to open the ends of the hollow fiber membranes; and
fastening a cap to the mid-case such that the composite gasket is compressed by the cap,
wherein the composite gasket comprises:
an inner body based on the groove, the inner body being located inside the mid-case;
an outer body based on the groove, the outer body being located outside the mid-case; and
a connecting body located between the inner body and the outer body, the connecting body being formed of a first material,
wherein at least a portion of the inner body is formed of a second material different from the first material,
wherein the inner body comprises:
a first part directly connected to the conn ctia body, the first part being formed of the first material; and
a second part adhered to the first part and to the fixing layer, the second part being formed of the second material, wherein together with the outer body and the connecting body the first part of the inner body constitutes a packing part formed of the first material, wherein the second part of the inner body constitutes a bracket part formed of the second material, and wherein the packing part and the bracket part are integrally formed through injection molding.

13. The method according to claim 12, wherein the preparing the composite gasket comprises:

preparing the bracket part;

inserting the bracket part into a mold;

injecting a melt of the first material into the mold in which the bracket part is located; and cooling the melt of the first material to obtain the packing part adhered to the bracket part.

14. The method according to claim 12, wherein the preparing the composite gasket comprises performing a co-injection molding to simultaneously form the bracket part and the packing part.

15. The method according to claim 12, wherein the preparing the hollow fiber membrane cartridge comprises:

inserting at least a portion of each of the hollow fiber membranes into an inner case; and performing a dip casting process or a centrifugal casting process to form the first fixing layer.

16. The method according to claim 15, wherein an end of the inner case is also potted in the first fixing layer together with the ends of the hollow fiber membranes when the dip casting process or the centrifugal casting process is performed.

\* \* \* \* \*